United States Patent [19]

De Blauwe

[11] 4,344,909

[45] Aug. 17, 1982

[54] THERMOCHROMIC COMPOSITION

[75] Inventor: Francis J. A. M. C. De Blauwe, Lubbeek, Belgium

[73] Assignee: N.V. Raychem S.A., Kessle-lo, Belgium

[21] Appl. No.: 105,587

[22] Filed: Dec. 20, 1979

[30] Foreign Application Priority Data

Dec. 22, 1978 [GB] United Kingdom ............... 49880/78

[51] Int. Cl.³ ...................... C09K 3/00; C10K 11/12; C09D 5/08; C09D 5/26
[52] U.S. Cl. ............... 264/230; 264/DIG. 71; 53/442; 116/207; 116/216; 252/408; 138/104; 422/61; 285/41; 285/93; 285/187; 285/381
[58] Field of Search .................. 73/356; 252/408; 285/41, 93, 187, 381; 138/104; 116/207, 216; 422/61; 53/442; 264/230, DIG. 71

[56] References Cited

U.S. PATENT DOCUMENTS

| | | | |
|---|---|---|---|
| 2,269,038 | 1/1942 | Perry et al. | 252/408 |
| 2,386,319 | 10/1945 | Johnson | 73/356 |
| 3,816,335 | 6/1974 | Evans | 252/408 |
| 3,828,612 | 8/1974 | Eriksson et al. | 73/356 |
| 3,973,438 | 8/1976 | Smith et al. | 73/339 R |
| 3,995,489 | 12/1976 | Smith et al. | 73/339 R |
| 4,105,583 | 8/1978 | Glover et al. | 73/356 |
| 4,108,001 | 8/1978 | Smith et al. | 252/408 |
| 4,142,416 | 3/1979 | Smith et al. | 252/408 |
| 4,179,926 | 12/1979 | Phillips et al. | 73/339 R |

FOREIGN PATENT DOCUMENTS

| | | | |
|---|---|---|---|
| 1458956 | 12/1976 | United Kingdom | 252/408 |
| 1488553 | 10/1977 | United Kingdom | 252/408 |
| 1511053 | 5/1978 | United Kingdom | 252/408 |
| 1521653 | 8/1978 | United Kingdom | 252/408 |
| 271070 | 8/1970 | U.S.S.R. | 73/356 |

OTHER PUBLICATIONS

Day, J.; "Thermochromism of Inorganic Compounds", Chem. Rev., vol. 68, No. 6, pp. 649–657 (1968).
Day, J.; "Thermochromism", Chem. Rev., vol. 63, pp. 65–80 (1963).

*Primary Examiner*—Teddy S. Gron
*Attorney, Agent, or Firm*—Lyon & Lyon

[57] ABSTRACT

Heat-recoverable articles carrying a "thermochromic" composition comprising organic materials which melt and decompose to provide a color-change indicating that the articles have been heated to a certain temperature, e.g. to melt a sealant carried on the surface of the article which is to contact a substrate around which the article is to be shrunk. Mixtures of relatively simple compounds may be used to graduate the color change, and means are described for preventing reversion to the original color on long-term exposure to moisture.

21 Claims, No Drawings

THERMOCHROMIC COMPOSITION

This invention relates to thermochromic compositions and more especially to such compositions in the form of coating compositions, such as paints, and markers such as crayons.

Thermochromic materials are those which change colour on being heated to a typical, usually well-defined, temperature. The change in colour is frequently reversible and associated with a reversible chemical change which occurs at that temperature. Such materials are discussed and reviewed, for example, in two articles by Jess. He. Day in Chem. Rev. 63, 65 (1963) and Chem. Rev. 68, 649 (1968).

Typically thermochromic materials are used as warning indicators that a certain maximum safety temperature has been reached or as means whereby a subsequent check will reveal that some critical temperature was attained; they have also found use in desk thermometers where different materials indicate different temperatures.

One especially interesting application of thermochromic materials has been in the field of heat-recoverable articles such as the heat-shrinkable polymeric sleeves described and claimed in U.S. Pat. Nos. 2,027,962; 3,086,242 and 3,957,372 and the heat-shrinkable wrap-around sleeves described and claimed in U.S. Pat. No. 3,379,218 and British Pat. Nos. 1,155,470; 1,211,988 and 1,346,479. Another type of heat-recoverable article is described in British Pat. No. 1,440,524 in which an elastomer member such as an outer tubular member is "held out" in a stretched state by a second member, such as an inner tubular member, which upon heating weakens and thus allows the elastomeric member to recover.

These heat-recoverable articles are typically provided with a sealant coating, for example on the inner surface of a heat-shrinkable sleeve, so that a seal is made between the sleeve and a substrate such as a pipe or cable when the sleeve shrinks around it. The sealants are usually mastics or hot-melt adhesives, for example those described and claimed in British Pat. No. 1,440,810 and German OS 2,723,116. In such cases, heat is required both to shrink the expanded plastics material and to melt the sealant. The heating means is often simply a torch which may degrade the plastic if it becomes too hot and yet, on the other hand, it is important that sufficient heat is applied to cause the sealant to melt and flow when in contact with the substrate. It has been proposed therefore in, for example, U.S. Pat. No. 3,816,335 and British Pat. No. 1,511,053, to use a suitable thermochromic paint on the surface of the heat-recoverable article in order to monitor and control the heat during recovery.

The use of these materials has been successful but those so far proposed have been inorganic in nature, which may occasionally be environmentally undesirable, and they have in general also exhibited a reversible colour change. This has caused some problems in applications where a check is made some time after recovery to ensure that the heat-recoverable device was heated to the correct temperature. A further problem has been that the basic (i.e. low temperature) colour of the inorganic thermochromic substance has clashed with design and/or coding requirements.

The present invention provides a heat-recoverable article which is to be heated to a pre-selected temperature during installation or use, which carries a temperature indicating composition comprising an organic material which on heating of the article to the said temperature melts and decomposes to provide a visible colour change. We have found that temperature-indicating compositions which are satisfactory for use on heat-recoverable materials can be based, according to the present invention, on surprisingly simple and inexpensive organic materials which decompose at or about their melting point. As will be explained in more detail hereinafter the materials are, in some respects, not classically "thermochromic" insofar as the colour change is generally irreversible. However, for convenience, they will hereinafter be referred to as thermochromic materials.

The essence of the present invention is that the thermochromic ingredient melts and decomposes on heating to a certain temperature (or narrow temperature range) and yields a decomposition product which has a different colour. In addition, on melting, a change in refractive index usually occurs which usefully acts as an indication of the onset of the irreversible colour change.

One advantage of using such materials is that they may themselves be virtually colourless thus allowing the use of conventional pigments for colouration and, for example, of fluorescent and/or phosphorescent substances for specific design purposes.

The substances preferably decompose at a temperature which is not more than ±10° C., preferably not more than ±5° C. different from the melting point. Given this concept, those skilled in the art will readily be able to choose suitable low-cost, non-toxic and, often, naturally-occurring materials for any given temperature. However, for heat-recoverable articles the temperature range of interest is typically from about 60° C. to 400° C., advantageously from 180° C. to 300° C., and the materials listed in the following Table have been found to be especially useful, the relevant decomposition temperature being indicated. Those compounds marked with a cross are through to be most advantageous and, in particular, allantoin (white to black), absorbic acid (white to black), lactose (white to black), creatine (white to black) and azo dicarbonamide (yellow to black) have been found most useful at their respective temperatures. Others which are found likely to be advantageous for particular end uses are D(+)-galatose, sucrose, methylene blue, β-alanine, methyl violet, glycine, nicotinic acid-N-oxide and 5-aminosalicylic acid.

It will be appreciated that many variations and modifications are possible within the basic concept of the present invention. For example the thermochromic ingredient may be part of an aqueous or non-aqueous vehicle comprising, for example, a polymeric binder, or may be part of a solid formulation, for example, a crayon based on a wax such as a paraffin wax. The nature of the thermochromic formulation will, of course, depend on the end use in a specific application.

TABLE

|  | Preferred | Tm (decomposition) |
|---|---|---|
| 1,2-Benzoquinone |  | 60–70 |
| Citraconic acid | X | 93 |
| Azobisisobutyronitrile |  | 102–103° C. |
| Fructose | X | 103–105° C. |
| Methyl yellow | X | 111 |
| 2,3-benzoxazin-1-one |  | 120 |

TABLE-continued

| | Preferred | Tm (decomposition) |
|---|---|---|
| Formamidine sulfinic acid | | 124–127 |
| D(+) Maltose | X | 130 |
| Malonic acid | | 132 |
| 1,3-acetonedicarboxylic acid | X | 133 |
| 4-aminosalicylic acid | | 135 |
| 5-anilino-1,2,3,4-thiatriazole | X | 146 |
| 1-phenyl-5-mercapto-tetrazole | | 150 |
| Formamidine acetate | X | 165 |
| D(+)-galactose | X | 170 |
| d(−)-tartaric acid | X | 171–174 |
| Aminoguanidine bicarbonate | X | 170 |
| Oxytetracycline | | 182–184 |
| Chinolinic acid | X | 185 |
| Sucrose | X | 190–192 |
| Ascorbic acid | X | 190–194 |
| Methylene blue | X | 190 |
| 2-hydroxy-1,4-dinaftoguinone | X | 192–195 |
| 2-methyl-3-indolylacetic acid | | 196–197 |
| Guanidinecarbonate | X | 198 |
| P-aminophenylacetic acid | | 199–200 |
| 5-amino-tetrazole monohydrate | | 200–204 |
| β-alanine | X | 200 |
| L-glutamic acid | X | 205 |
| Methyl violet | X | 208–210 |
| L-lysine | | 210 |
| 2,4-dihydroxybenzoic acid | | 214–216 |
| 4-hydrazinobenzoic acid | | 215 |
| Azodicarbonamide | X | 215 |
| α-lactose | X | 219 |
| 3-amino-1-phenyl-pyrazolone | | 220 |
| 4-amino-3-hydroxy-butyric acid | | 225 |
| 4-amino-3-hydrazino-5-mercapto-1,2,4-triazole | | 228–230 |
| Allantoin | X | 234 |
| Imino-diacetic acid | | 240 |
| Dimethylglyoxime | | 242 |
| Oxalic acid dihydrazide | | 242–244 |
| Ethylene diamino tetra acetic acid | X | 245 |
| Glycine | X | 250 |
| Hesperidin | | 250–255 |
| Barbituric acid | | 250–252 |
| Nicotinic acid-N-oxide | | 260 |
| Phenyl-2-piperidyl-acetic acid | | 260–265 |
| Succinamide | | 263–266 |
| DL-phenylalanine | X | 271–273 |
| 5-amino-salicylic acid | | 280 |
| Dl-methionine | X | 281 |
| DL-alanine | X | 290 |
| N-hydroxyethyl ethylenediamine triacetic acid trisodium salt dihydrate | | 288–290 |
| Creatine | X | 295 |
| 2-amino octanic acid | | 295 |
| Maleic acid dihydrazide | X | 300 |
| Nile blue | X | 305 |
| 2-hydroxy-benzimidazole | | 318 |
| 1,4-benzenedicarboxylic acid | X | 325 |
| Dinicotinic acid | X | 325 |
| 4,4-azobenzenedicarboxylic acid | X | 330 |
| 6-uracilcarboxylic acid | X | 347 |
| Melamine | X | 354 |
| Guanine | X | 360 |
| Oxamide | X | 400 |

However, as will be understood from the foregoing discussion, the present invention is especially useful in the thermochromic marking of heat-recoverable articles, especially heat-shrinkable tubing, wrap-around sleeves and end-caps. For this purpose, it is advantageous to formulate a coating composition usually comprising a polymeric binder.

For example, one currently preferred thermochromic paint for the production of heat-recoverable articles according to the invention comprises the organic thermochromic material, e.g. allantoin, a polymeric binder, e.g. an acrylic resin, and an organic solvent, preferably a halogenated, e.g. chlorinated, solvent. Chlorinated solvents have been especially useful because they are good solvents for the binder, have low toxicity, are non-flammable and evaporate quickly at room temperature because of their high vapour pressures. Amongst suitable chlorinated solvents there may be mentioned 1,1,1-trichloroethylene and mixtures thereof. Suitable binder resins include acrylic resins such as Paraloid B-66 (Rohm & Haas) which is a copolymer of n-butylmethacrylate with methylmethacrylate. Other suitable materials include ethylene/vinyl acetate copolymers, ethylene/alkylacrylate copolymers, chlorinated polyethylenes, vinyl chloride homo- and co-polymers, especially vinylacetate/vinyl chloride co-polymers which may be wholly or partially hydrolyzed, and polyvinyl acetate, which may also be partially hydrolyzed.

However, it must be emphasized that other materials will be suited to different applications, including, for example, water-based latex paints.

Equally, the amount of thermochromic material incorporated may vary according to the application but in the coating compositions described above, will typically be in the range of from 1 to 20%, especially from 5 to 10%, based on the weight of the composition.

Other ingredients can be added as appropriate. For example a pigment such as an organic dye, e.g. sunfast blue or sumatra yellow may be added for colouring purposes. Thickening agents, e.g. fumed silica (e.g. Cab-O-Sil and Aerosol) may be added to improve the rheological properties. In this respect, organic thickening agents with low melting points are especially preferred because they do not interfere with the colour change.

One such organic thickening agent is Thixatrol ST which is a derivative of castor oil sold by National Lead which may be used at levels of 0.5% by weight and higher, especially 1% and more, in the above described formulations.

Antioxidants, such as Irganox 1010 and Platinox 1212, and plasticizers such as dioctyl phthalate may also advantageously be incorporated.

It is usually preferred to use a temperature-indicating composition according to the present invention which is initially green in colour, and this may be achieved by addition of suitable dye-stuffs to the formulation. A colour change to black or near-black is often desirable for optimum appearance when black heat-recoverable articles are installed, and this is readily achieved by the use of the aforementioned materials which decompose at the relevant temperature to give black or near-black decomposition products.

Mixtures of the decomposable materials may be used to produce a more gradual colour change as a signal to the operator that the desired temperature is being approached, and in such cases it is preferred to use about 9 parts of a material having a higher decomposition temperature to one part of material(s) having a lower decomposition temperature. For example nine parts of allantoin to one part of ascorbic acid or sucrose could be used.

In some cases it has been found that the decomposition products may be leached out by long term exposure to moisture leaving behind a shell of binder which may incorporate enough dyestuff to resemble the original (unheated) colour of the chromogenic paint, thus leading to confusion as to whether or not the heat-recoverable product was correctly heated on installation. This effect can be rendered less troublesome by including in the formulation a background-colouring dyestuff which is itself decomposed during the heating. Methylene Blue is one possible material for this purpose but it is preferred to use the less water-soluble dyestuff Indigo Blue. A most preferred approach, however, is to attach the dyestuff or pigment to the decomposable material (e.g. allantoin) preferably by chemical coupling and preferably before it is incorporated in the temperature-indicating composition. The coupling bond may be ionic or covalent, and suitable bonds may be obtained by the use of appropriate coupling agents, for example sulphonyl or cyanuric chloride.

The thermochromic composition of the present invention is especially useful on heat-recoverable articles which are to be applied around a body, e.g. a cable splice, and have on their interior surface installed a coating which must be melted to ensure adequate sealing of the resulting enclosure. The composition in such cases is formulated to produce the colour change when the exterior surface of the article has been heated to a temperature which results in the desired melting of the interior coating when in contact with the substrate (assuming no abnormal heat-sink effects).

The following Example illustrates a typical thermochromic paint formulation for use in accordance with the present invention with heat-recoverable articles.

| Compound | Parts by Weight |
| --- | --- |
| Paraloid B-66 (Acrylic resin) | 4.00 |
| 1,1,1-Trichloroethane | 57.69 |
| Perchloroethylene | 20.00 |
| Allantoin | 16.00 |
| Sunfast Blue or Cinquasia Green | 0.06 |
| Irganox 1010 | 0.25 |
| Plastinox 1212 | 0.25 |
| Dioctyl phthalate | 0.50 |
| Methanol/H$_2$O (smoothing agent) | 0.25 |
| Thixatrol ST | 1.00 |

Whilst one object of the present invention is to provide thermochromic paints and inks which are suitable for use in the monitoring and control of heating plastics articles, especially cross-linked polymeric articles such as the heatrecoverable products mentioned above, it will be appreciated that it is also applicable to other substrates and applications, including, for example, heat-recoverable articles made from memory metals as described in British Pat. Nos. 1,327,441 and 1,488,393, especially the preconditioned alloys described and claimed in U.S. Pat. Nos. 4,036,669; 4,067,752 and 4,095,999.

In contrast with the previously proposed inorganic thermochromic formulations which have sometimes been adversely affected by heat-aging, or environmentally undesirable, and have had an undesirable tendency to reverse colour, especially under wet or moist conditions and a tendency to deteriorate catalysed by acids and bases with a resultant change in temperature response, the organic compounds of the present invention are generally stable, non-reversible, environmentally acceptable, and give reproducible results.

I claim:

1. A heat-recoverable article which is to be heated to a pre-selected temperature during installation or use, which is capable of forming an enclosure about a body, which carries on a surface which will face the interior of the enclosure a meltable composition, and which carries a temperature indicating composition on a surface which will be visible when the article is enclosing the body, the temperature indicating composition comprising decomposable organic material which, on heating of the article to the pre-selected temperature, melts and decomposes substantially irreversibly to provide a visible color change, said pre-selected temperature being a temperature which results in the melting of said meltable composition to effect sealing of the enclosure.

2. An article according to claim 1, wherein the temperature indicating composition comprises a mixture of decomposable organic materials which melt and decompose at different temperatures from one another.

3. An article according to claim 2, wherein the temperature indicating composition comprises 8.5 to 9.5 parts by weight of a decomposable organic material having a higher decomposition temperature, and 0.5 to 1.5 parts by weight of a decomposable organic material having a lower decomposition temperature.

4. An article according to any one of claim 1, 2, or 3, wherein the said decomposable organic material comprises allantoin.

5. An article according to any one of claim 1, 2, or 3, wherein the said decomposable organic material comprises ascorbic acid, lactose, creatine or azo dicarbonamide.

6. An article according to any one of claim 1, 2, or 3, wherein the said decomposable material comprises D(+)-galactose, sucrose, methylene blue, β-alanin, methyl violet, lysine, nicotinic acid-N-oxide, or 5-amino-salicylic acid.

7. An article according to claim 1, wherein the temperature indicating composition is coloured by means of a pigment or dyestuff in addition to the said decomposable organic material.

8. A heat-recovered article which has been heated to a pre-selected temperature to form an enclosure about a body, which carries on a surface which faces the interior of the enclosure a melted composition that melted at the pre-selected temperature to effect sealing of the enclosure, and which carries a temperature indicating composition on a visible surface, the temperature indicating composition comprising organic material which, upon heating of the article to said pre-selected temperature, has melted and substantially irreversibly decomposed to provide a visible color change.

9. A method of enclosing a body comprising selecting a heat-recoverable article which is capable of forming an enclosure about a body, which carries on a surface which will face the interior of the enclosure a meltable composition, and which carries a temperature indicating composition on a surface which will be visible when the article is enclosing the body, the temperature indicating composition comprising decomposable organic material which, on heating of the article to a pre-selected temperature, melts and decomposes substantially irreversibly to provide a visible color change; positioning around the body the heat-recoverable article; and heating the article to at least the pre-selected temperature so as to (i) recover the article about said body, (ii)) melt the meltable material to effect sealing of the enclosure, and (iii) to cause the temperature indicating composition to melt and decompose substantially irreversibly to undergo the visible color change, the temperature indicating composition being visible.

10. A kit of parts for use in providing a sleeve enclosure around an elongate body, the kit including an article according to any one of claim 1, 2, 3, or 7.

11. A kit-of-parts which comprises a heat recoverable article for providing an enclosure about a body and a coating composition for the heat recoverable article, the coating composition comprising a polymeric binder resin and a thermochromic ingredient comprising a decomposable organic material; on heating the composition to a temperature between 80° and 400° C., the organic material melts and decomposes to provide a substantially irreversible visible colour change.

12. A kit-of-parts which comprises a heat recoverable article for providing an enclosure about a body and a solid composition in the form of a crayon comprising a wax and a thermochromic ingredient comprising a decomposable organic material; on heating the composition to a temperature between 80° and 400° C., the organic material melts and decomposes to provide a substantially irreversible visible colour change.

13. A kit-of-parts which comprises a heat recoverable material for providing an enclosure about a body and a water based latex paint composition, the composition having a thermochromic ingredient comprising a decomposable organic material; on heating the composition to a temperature between 80° and 400° C., the organic material melts and decomposes to provide a visible colour change.

14. An article according to claim 8, wherein the temperature indicating composition before decomposition comprised a mixture of decomposable organic materials which melted and decomposed at different temperatures from one another.

15. An article according to claim 14, wherein the temperature indicating composition before decomposition comprised 8.5 to 9.5 parts by weight of a decomposable organic material having a higher decomposition temperature, and 0.5 to 1.5 parts by weight of a decomposable organic material having a lower decomposition temperature.

16. A method according to claim 9, wherein the temperature indicating composition comprises a mixture of decomposable organic materials which melt and decompose at different temperatures from one another.

17. A method according to claim 16, wherein the temperature indicating composition comprises 8.5 to 9.5 parts by weight of a decomposable organic material having a higher decomposition temperature, and 0.5 to 1.5 parts by weight of a decomposable organic material having a lower decomposition temperature.

18. A method according to any one of claims 9, 16, or 17, wherein the decomposable organic material comprises allantoin.

19. A method according to any one of claims 9, 16, or 17, wherein the decomposable organic material comprises a material selected from the group consisting of ascorbic acid, lactose, creatine or azo dicarbonamide.

20. A method according to any one of claims 9, 16, or 17, wherein the decomposable material comprises a material selected from the group consisting of D(+)-galactose, sucrose, methylene blue, B-alanin, methyl violet, lysine, nicotinic acid-N-oxide, and 5-amino-salicylic acid.

21. A method according to claim 9, wherein the temperature indicating composition is coloured by means of a pigment or dyestuff in addition to the decomposable organic material.

* * * * *